United States Patent [19]
Wolber

[11] 3,732,458
[45] May 8, 1973

[54] CIRCUIT ARRANGEMENT FOR CORRECTING THE DEFLECTION OF AT LEAST ONE ELECTRON BEAM IN A TELEVISION PICTURE TUBE BY MEANS OF A TRANSDUCTOR

[75] Inventor: Jorg Wolber, Hamburg, Germany

[73] Assignee: U.S. Philips Corporation, New York, N.Y.

[22] Filed: July 16, 1970

[21] Appl. No.: 55,524

[30] Foreign Application Priority Data

Aug. 7, 1969 Germany....................P 19 40 216.5

[52] U.S. Cl. ............315/24, 315/27 GD, 315/27 SR

[51] Int. Cl. ..........................................H01j 29/76

[58] Field of Search ...............315/24, 27 GD, 27 SR

[56] References Cited

UNITED STATES PATENTS

| | | | |
|---|---|---|---|
| 3,329,859 | 7/1967 | Lemke | 315/27 SR |
| 3,329,862 | 7/1967 | Lemke | 315/27 SR |
| 3,441,958 | 4/1969 | Korver | 315/24 X |

*Primary Examiner*—Leland A. Sebastian
*Attorney*—Frank R. Trifari

[57] ABSTRACT

A circuit arrangement for raster correction in a television picture tube by means of a transductor whose power winding is connected in parallel with at least a portion of the line deflection coils, the line deflection generator having a low internal impedance. In order to increase this impedance a mainly inductive impedance is connected in series with the generator. In a picture tube employing at least two electron beams the series impedance may include the convergence circuit. As a result the convergence in the corners of the picture screen is also improved. The linearity control circuit may likewise form part of the series impedance.

6 Claims, 2 Drawing Figures

Figure 1:
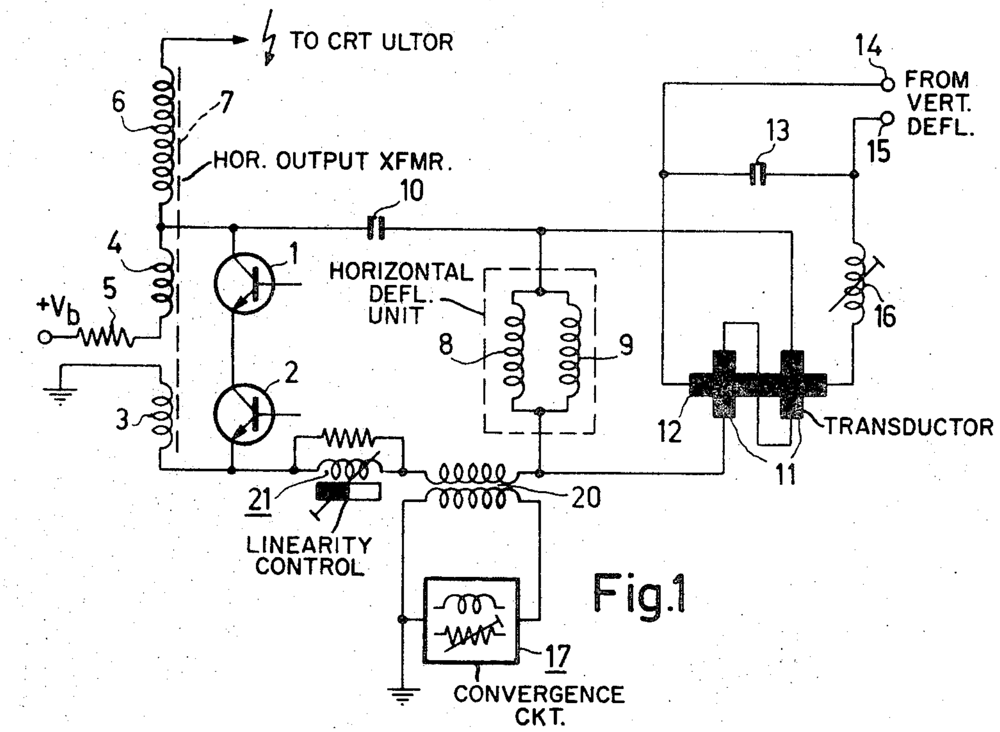

INVENTOR.
JORG WOLBER
BY [signature]
AGENT

CIRCUIT ARRANGEMENT FOR CORRECTING THE DEFLECTION OF AT LEAST ONE ELECTRON BEAM IN A TELEVISION PICTURE TUBE BY MEANS OF A TRANSDUCTOR

The invention relates to a circuit arrangement for correcting the deflection of at least one electron beam (raster correction) in a television picture tube by means of a saturable reactor a power winding of which is connected in parallel with at least a portion of the coils for the horizontal deflection, the current flowing through these coils being supplied by a deflection generator having a low internal impedance.

A circuit arrangement for raster correction with the aid of a transductor is described, for example, in U.S. Pat. No. 3,444,422. In this patent the power winding of a transductor is connected in parallel with the horizontal deflection coils while the control winding receives a signal of field frequency so that the current of line frequency which flows through the deflection coils is modulated at the field-frequency (East-West correction), whereas the vertical deflection current is modulated at the line frequency (North-South correction). However, in this known arrangement there is the difficulty that the transductor can exert little influence on the horizontal deflection current if the internal impedance of the deflection generator is low because the transductor then only constitutes an additional load on the generator. This is the case when the deflection generator includes a valve with feedback — or a switch formed with one or more transistors. In order to be able to use a transductor arrangement also in such a case the circuit arrangement according to the invention is characterized in that a mainly inductive impedance is connected in series between the said parallel arrangement and the deflection generator.

Due to the step according to the invention the internal impedance of the deflection generator is increased and the different components of the circuit remain mainly inductive so that the deflection current is more or less linear when the voltage provided by the deflection generator during the line scan period is substantially constant. The series impedance may be, for example, a fixed coil. However, the invention is furthermore based on the recognition of the fact that the increase in the internal resistance of the horizontal deflection generator may not only be obtained by a constant impedance, but other arrangements envisaging other improvements of the deflection may be used for this purpose. In that case even special improvements may be obtained as will be apparent hereinafter and possible small non-linearities of the additionally used arrangements have no detrimental results.

It is true that in known convergence circuits in picture tubes employing a plurality of electron beams a satisfactory improvement is obtained for the central horizontal and vertical lines of a picture tube of the shadow mask type. However, it is found that convergence errors may subsist in the corners of the picture. Known circuit arrangements which correct these second-order errors are often complicated and expensive. In the circuit arrangement according to the invention a satisfactory compensation of such convergence errors is possible in a simple manner if the series impedance which is arranged between the horizontal deflection generator and the deflection coils includes the convergence circuit. In this manner the sum of the deflection current and of the current derived for the field correction and modulated by the transductor flows through the convergence circuit so that the desired additional convergence correction in the corners of the written raster is obtained.

Figure 2:
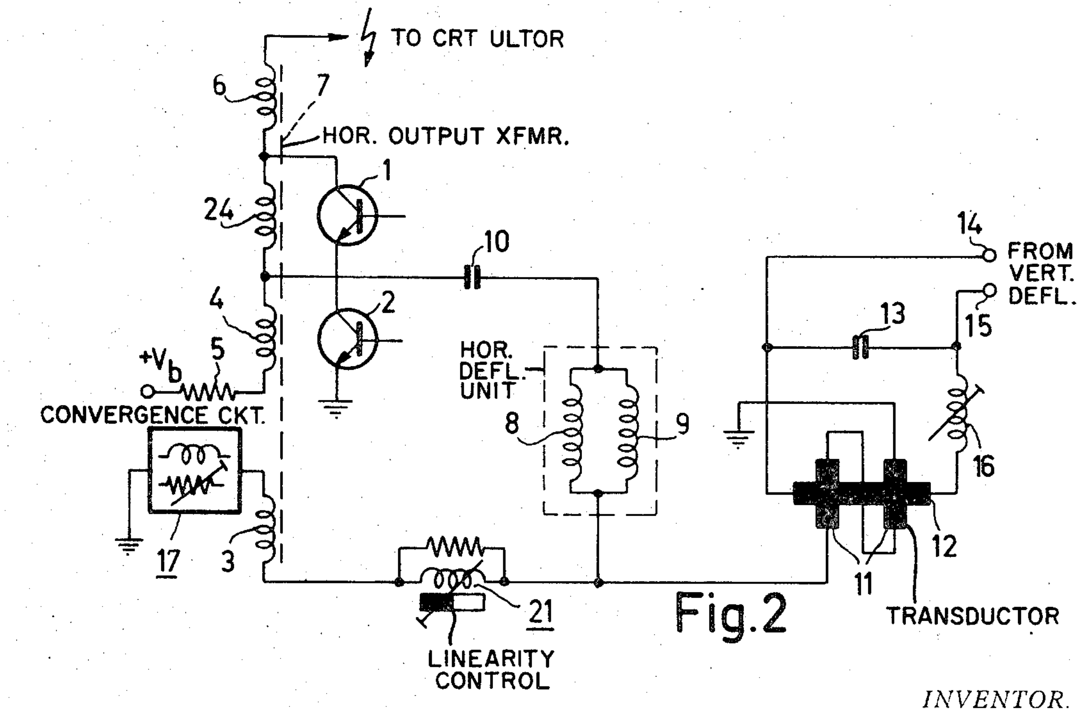

In order that the invention may be readily carried into effect a few embodiments thereof will now be described in detail by way of example with reference to the accompanying diagrammatic drawings in which:

FIG. 1 shows a circuit arrangement in which the transductor is connected in parallel with the deflection coils, while in FIG. 2 the transductor is only fed by part of the voltage applied to the deflection coils.

FIG. 1 shows two line-output transistors 1 and 2 which are arranged in series. The emitter of transistor 2 is connected to ground through a winding 3 while the collector of transistor 1 is connected through a winding 4 and a small series impedance 5, preferably a resistor, to the positive terminal of a supply source $V_b$ whose negative terminal is connected to ground.

Windings 3 and 4 are wound together with an EHT-winding 6 on the same transformer core 7. The ends of windings 3 and 4 remote from each other are connected through the capacitor 10 for the S-correction to the deflection-unit consisting of two windings 8 and 9 arranged, for example, in parallel. The base of transistors 1 and 2 receive pulses of line frequency in a manner not shown in FIG. 1 so that these transistors are cut off during the flyback period. During the scan period, a substantially constant voltage is applied to the deflection unit. Consequently a more or less sawtooth-shaped current flows through windings 8 and 9. The bipartite power winding 11 of a transductor ensuring the raster correction is connected in parallel with this deflection unit 8, 9. The control winding 12 of said transductor, and a converting capacitor 13 in parallel therewith form part of the circuit for the vertical deflection through terminals 14 and 15. An adjustable coil 16 with which the raster correction can be adjusted exactly is connected in series with winding 12.

Windings 3 and 4 have the same number of turns so that pulses of the same amplitude and reversed polarity are produced at the emitter of transistor 2 and at the collector of transistor 1. As a result a disturbing radiation of these pulses is reduced. Furthermore, transistor types are chosen in this Example for transistors 1 and 2 whose collector-base diodes may function as efficiency diodes. All this has been described in U.S. Pat. No. 3,504,224.

According to the invention the convergence circuit 17 is arranged through a separation transformer 20 between the end of winding 3 remote from winding 4 and the horizontal deflection coils 8, 9. Furthermore, this current branch includes the linearity control circuit 21 which comprises the parallel arrangement of a resistor and a coil whose inductance is adjustable, for example, by means of premagnetization of the core of the coil. A current, which is the sum of the current for the deflection coils 8, 9 and of the current for the power winding 11 of the transductor, flows through the primary winding of transformer 20. This primary current is transformed to the secondary circuit of transformer 20 so that a current flows through convergence circuit 17.

In known arrangements the convergence current is only influenced by the deflection current itself. It has been found that in this case the convergence correction is not sufficient in the corners of the picture. At these areas, where the deflection in both directions is at a maximum, a greater intensity of the convergence current is required. This is especially the case in picture tubes having a great deflection angle and according to the invention this is achieved in that the current which is derived from the power winding 11 of the transductor for the raster correction is also applied to the convergence circuit. This current flows from the horizontal deflection generator constituted by windings 3 and 4 through the primary winding of transformer 20 to power winding 11 of the transductor. The transductor current is in fact at a minimum in the center of the picture and increases towards the edges and particularly towards the corners. Thus the convergence current varies in the desired manner. According to the invention the desired improvements of the convergence correction and simultaneously the likewise desired increase in the internal resistance of the horizontal deflection generator is consequently obtained without a considerable increase in the number of required circuit elements and without disturbing the normal operation of the circuit arrangement. Due to transformer 20 a terminal of convergence circuit 17 may be connected to ground so that the convergence can be adjusted safely. If necessary, a suitable impedance transformation may also be obtained with the aid of transformer 20.

The linearity control circuit 21 may alternatively be connected in series with the said branch which includes transformer 20. As a result the internal resistance of the horizontal deflection generator for the line frequency is further increased without the field correction and the convergence correction being disturbingly influenced.

FIG. 2 shows a modification of the circuit arrangement according to the invention in which the deflection current is not changed relative to that of FIG. 1. The end of power winding 11 of the transductor shown on the upper side of FIG. 1 is connected to ground in FIG. 2. In addition convergence circuit 17 is included between winding 3 and ground so that separation transformer 20 may be omitted. If as a first approximation the impedances 5 and 17 are assumed to be negligibly small relative to the other impedance of the circuit arrangement, power winding 11 may be considered to be connected to a tap on the deflection generator 3, 4. Consequently, only approximately half the voltage of the deflection generator is applied to transductor winding 11 which winding must therefore be proportioned in such a manner that it can convey a current which is approximately twice as large as that of FIG. 1. This larger current also flows through convergence circuit 17 which, with the omission of separation transformer 20, is favorable for the convergence in the corners of the picture screen.

In FIG. 2 the emitter of transistor 2 is connected to ground i.e., the said tap on the deflection generator. During the scan period the series arrangement of supply source $V_b$ and windings 3 and 4 FIG. 1 is substantially short-circuited by transistors 1 and 2. In order that these transistors in the circuit arrangement according to FIG. 2 operate under the same circumstances as those in FIG. 1, an additional winding 24 must be wound on core 7 between windings 4 and 6, winding 24 having the same number of turns as winding 3, and the collector of transistor 1 must be connected to the junction of windings 6 and 24.

The end of power winding 11 connected to ground in FIG. 2 may alternatively be connected for the desired adjustment of the corner convergence to a different tap on the transformer, that is to say, on winding 3 or 4.

Resistor 5 serves in known manner mainly as a safety resistor so that in case of an inadmissible load of the EHT, for example, as a result of flash-over in the picture tube, the supply voltage for transistors 1 and 2 is reduced so that overload of these transistors is avoided.

What is claimed is:

1. A deflection circuit for a cathode ray tube comprising a transistor horizontal deflection generator; a horizontal deflection coil parallel coupled to said generator; means for pincushion correction of said tube comprising a saturable reactor having a control winding adapted to receive a vertical deflection signal and a power winding parallel coupled to at least a portion of said deflection coil; and means for increasing the effectiveness of said correction means comprising an impedance element external to said generator having a substantially inductive reactance series coupled between said generator and said coil.

2. A circuit as claimed in claim 1 wherein said generator comprises a transformer having a tap and said power winding has a first end coupled to said coil and a second end coupled to said tap.

3. A circuit as claimed in claim 1 wherein said impedance element comprises means for controlling the linearity of the beam deflection.

4. A deflection circuit for a cathode ray tube having at least two electron beams comprising a transistor horizontal deflection generator; a horizontal deflection coil parallel coupled to said generator; means for pincushion correction of said tube comprising a saturable reactor having a control winding adapted to receive a vertical deflection signal and a power winding parallel coupled to at least a portion of said deflection coil; means for increasing the effectiveness of said correction means comprising an Impedance element external to said generator having a substantially inductive reactance series coupled between said generator and said coil; and means for dynamically converging said beams comprising a convergence circuit coupled to said horizontal generator and to said transductor.

5. A circuit as claimed in claim 4 wherein said generator comprises a transformer having a tap and said power winding has a first end coupled to said coil and a second end coupled to said tap.

6. A circuit as claimed in claim 4 wherein said impedance element comprises means for controlling the linearity of the beam deflection.

* * * * *